United States Patent [19]

Crivello

[11] 4,241,204
[45] * Dec. 23, 1980

[54] CATIONICALLY CURABLE ORGANIC RESIN COMPOSITIONS CONTAINING SULFONIUM SALTS AND AN ORGANIC OXIDANT

[75] Inventor: James V. Crivello, Clifton Park, N.Y.

[73] Assignee: General Electric Company, Schenectady, N.Y.

[*] Notice: The portion of the term of this patent subsequent to Oct. 28, 1997, has been disclaimed.

[21] Appl. No.: 11,101

[22] Filed: Feb. 12, 1979

[51] Int. Cl.$^3$ ................................................ G03C 1/68
[52] U.S. Cl. ..................................... 526/333; 526/142; 526/192; 526/193; 526/195; 526/222; 430/280; 528/14; 528/55; 528/90; 528/139
[58] Field of Search .......................... 96/115 R, 115 P; 204/159.18, 159.24; 252/426; 526/222, 333, 192; 528/139, 90, 14, 55; 430/280; 426/142, 193

[56] References Cited

U.S. PATENT DOCUMENTS

| | | | |
|---|---|---|---|
| 3,412,046 | 11/1968 | Payne | 260/2 |
| 4,058,400 | 11/1977 | Criuello | 96/115 R |
| 4,058,401 | 11/1977 | Crivello | 96/115 R |
| 4,069,054 | 1/1978 | Smith | 96/115 P |

OTHER PUBLICATIONS

Abdul-Rausoul et al., Polymer, 1978, vol. 19, Oct., pp. 1219–1222.

*Primary Examiner*—Jack P. Brammer
*Attorney, Agent, or Firm*—William A. Teoli; James C. Davis, Jr.

[57] ABSTRACT

Curable organic resin compositions, such as epoxy resins, are provided, based on the use of dialkyl hydroxy arylsulfonium salts in combination with certain organic oxidants such as iodosoaromatic esters, or the use of certain amines or transition metals in combination with organic peroxides. The curable compositions can provide flexible or rigid organic resin foam when used with a volatile organic solvent as a result of exothermic heat of cure.

10 Claims, No Drawings

CATIONICALLY CURABLE ORGANIC RESIN COMPOSITIONS CONTAINING SULFONIUM SALTS AND AN ORGANIC OXIDANT

CROSS REFERENCE TO RELATED APPLICATIONS

Ser. No. 11,102 for Heat Curable Compositions, filed concurrently herewith, Ser. No. 962,997, now abandoned, filed on or about Nov. 20, 1978, for Curable Organic Resin Compositions and Foaming Method, which is a continuation-in-part of Ser. No. 861,127, filed Dec. 16, 1977, for Curable Organic Resin Compositions and Foaming Method, now abandoned, copending application Ser. No. 861,128, for Heat Curable Compositions, filed Dec. 16, 1977 now U.S. Pat. No. 4,173,551 which is a continuation-in-part application of Ser. No. 781,785, filed Mar. 28, 1977, for Heat Curable Epoxy Compositions and Method for Curing Same, now abandoned, copending application Ser. No. 841,351, filed Oct. 12, 1977 now abandoned, for Heat Curable Compositions, which is a continuation in-part of Ser. No. 689,247, filed May 24, 1976, for Epoxy Compositions and Method of Curing Same, now abandoned, where all of the aforesaid applications are assigned to the same assignee as the present invention.

BACKGROUND OF THE INVENTION

The present invention relates to heat curable compositions and to a foaming method. More particularly, the present invention relates to the cure of a variety of cationically polymerizable materials, such as epoxy resins, with dialkylhydroxyarylsulfonium salts, in combination with certain organic oxidants, for example, iodoso-aromatic compounds, or organic peroxides with organic amine, or transition metal accelerators.

In my copending application Ser. No. 962,997 now abandoned, filed on or about Nov. 20, 1978, for Curable Organic Resin Compositions and Foaming Method, a diaryliodonium salt is used in combination with a copper salt and certain reducing agents, such as ascorbic acid, $Sn^{+2}$ compounds, or activated α-hydroxy compounds to effect the cure of a variety of cationically polymerizable organic compositions such as epoxy resins, phenol-formaldehyde resins, etc.

The present invention is based on the discovery that certain dialkylhydroxyarylsulfonium salts of the formula, $$[R(R^1)_a S]^+ [Y]^-, \quad (1)$$

where R is a $C_{(6-20)}$ aromatic radical having from 1 to 3 nuclearly bonded hydroxy radicals, $R^1$ can be the same or different $C_{(1-8)}$ alkyl radical or an alkylene radical capable of forming a cycloaliphatic or heterocyclic ring, Y is a non-nucleophilic anion, a is an integer equal to 1 or 2, and when $R^1$ is alkyl, a is 2, and when $R^1$ is alkylene, a is 1, also can be used to effect the cure of a variety of cationically polymerizable organic materials, when such arylsulfonium salts are used in combination with certain organic oxidants, for example, iodosoaromatic compounds, quinones, etc., and organic peroxides used in combination with organic amine or transition metal accelerators.

STATEMENT OF THE INVENTION

There is provided by the present invention, curable compositions comprising (A) cationically polymerizable organic material, and (B) an effective amount of a curing agent consisting essentially of a dialkylhydroxyarylsulfonium salt of formula (1), and an organic oxidant selected from iodosoaromatic organic compounds, quinones and organic peroxides having a decomposition accelerator selected from organic amines and and transition metals.

Anions included by Y of formula (1) are, for example, $MQ_d$, where M is a metal or metalloid, Q is a halogen radical and d is an integer having a value of from about 4-6 inclusive. Besides epoxy resins, formula (1) sulfonium salts also have been found to be useful in curing cyclic ethers, lactones, lactams and cyclic acetals, etc., where the sulfonium salts also can have non-nucleophilic counterions such as perchlorate, $CF_3SO_3^-$ and $C_6H_4SO_3^-$. Again, the cationically polymerizable material can be a phenol-formaldehyde, urea-formaldehyde or melamine-formaldehyde resin, Y of formula (1) also can include in addition to $MQ_d$ and other non-nucleophilic counterions previously recited, halide counterions such as Cl, Br, F and I as well as nitrate, phosphate, etc.

Radicals included by R of formula (1) are, for example,

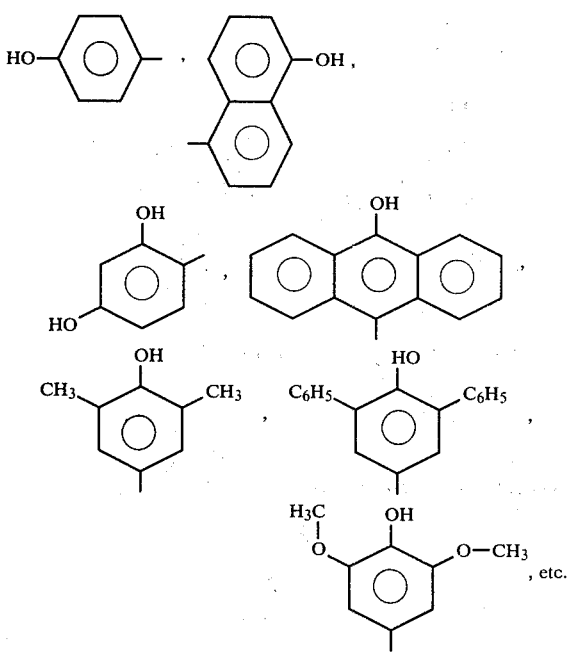

, etc.

$R^1$ radicals include $CH_3-$, $C_4H_9-$, $-(CH_2)_4-$, $-(CH_2)_5-$, $-CH_2-CH_2-O-CH_2-CH_2-$, $-CH_2-CH_2-S-CH_2CH_2-$, $C_6H_5-CH_2-$, $C_2H_5-$, etc. Complex anions included by $MQ_d$ are, for example, $BF_4^-$, $PF_6^-$, $AsF_6^-$, $SbF_6^-$, $FeCl_4^-$, $SnCl_6^-$, $SbCl_6^-$, $BiCl_5^=$, $AlF_6^{-3}$, $GaCl_4^-$, $InF_4^-$, $TiF_6^=$, $ZrF_6^-$, etc., where M is a transition metal such as Sb, Fe, Sn, Bi, Al, Ga, In, Ti, Zr, Sc, V, Cr, Mn, Cs, rare earth elements such as the lanthanides, for example, Ce, Pr, Nd, etc., actinides, such as Th, Pa, U, Np, etc., and metalloids such as B, P, As, etc.

Preferably the salts included by formula (1), are

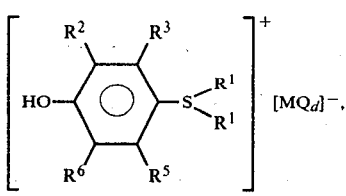

where $R^1$, M, Q and d are as previously defined, and $R^2$-$R^6$ are the same or different monovalent radicals selected from hydrogen, $C_{(1-8)}$ alkyl, $C_{(1-8)}$ alkoxy, nitro, chloro, hydroxy, etc.

Dialkylhydroxyphenylsulfonium salts included by formulas (1) and (2) are

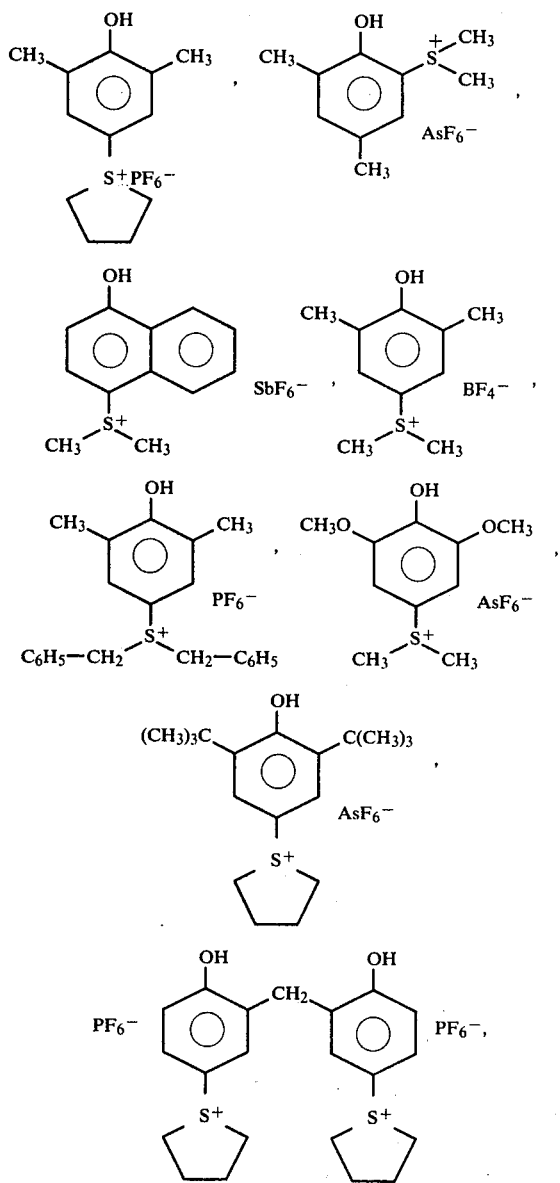

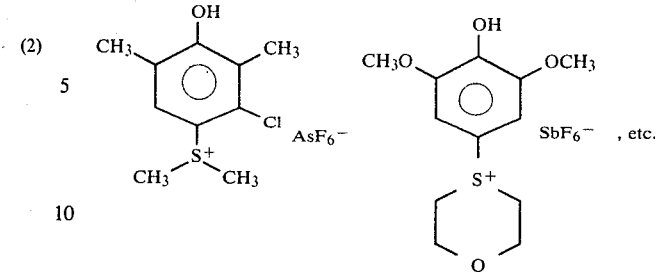

Methods for making some of the dialkyl hydroxyarylsulfonium salts of formulas (1) and (2) are shown in U.S. Pat. Nos. 4,058,400 and 4,058,401, and in my copending applications Ser. No. 833,146, filed Sept. 14, 1977 now U.S. Pat. No. 4,161,478 and Ser. No. 954,196, filed Oct. 24, 1978, now abandoned.

There is also provided by the present invention, a foaming method which comprises, (1) agitating a curable composition comprising,
(C) a cationically polymerizable organic material
(D) an effective amount of a curing agent consisting essentially of the dialkylhydroxyarylsulfonium salt of formulas (1) or (2), and an organic oxidant selected from an iodosoaromatic compound, a quinone, and an organic peroxide having a decomposition accelerator selected from an organic amine and a transition metal, and
(E) 1% to 30% by weight of (C), (D) and (E) of a volatile inert organic solvent, and (2) thereafter allowing the ingredients of the resulting mixtures to react resuting in the production of exothermic heat and the simultaneous evaporation of the organic solvent and the cure of the cationically polymerizable organic resin.

The organic oxidant which is utilized in the practice of the invention can be employed in the curable compositions at from 0.1% to 10% by weight of composition and preferably at from 1% to 5% by weight.

Included by the iodoso-aromatic compounds which can be used in combination with the dialkylhydroxyarylsulfonium salt are, for example, iodosobenzene diacetate, iodosobenzene, 4-nitroiodosobenzene, 4-chloroiodosobenzene diacetate, 4-methoxyiodosobenzene, 4-iodosobiphenyl, 2-chloroiodosobenzene diacetate. The organic oxidant used in the practice of the invention also can consist of organic peroxides in combination with accelerators such as organic amines, for example, N,N-dimethylaniline, diphenylamine, N,N'-tetramethylbenzidine, N,N'-diphenylphenylene-1,4-diamine, N-phenylpiperadine, Michler's ketone, N-phenyldiethanolamine, etc. In addition to the aforementioned organic amine accelerators which can be used at from 0.1% to 50% by weight, based on the weight of organic peroxide, there also can be used as organic peroxide decomposition accelerators carboxylic acid compounds of transition metals, for example, cobalt napthenate, copper napthenate, cobalt stearate, stannous octpate, iron stearate, zinc octoate, cobalt laurate, iron palmitate, stannous caproate, etc., at 0.1% to 50% by weight of organic peroxides. Organic peroxides include ketone peroxides, peroxy acids, dibasic acid peroxides, aldehyde peroxides, alkyl peroxides, hydroperoxides, alkyl peroxyesters, diperoxide derivatives, for example, t-butyl peroxypivalate, ortho-dichlorobenzoyl peroxide, caprylyl peroxide, lauroyl peroxide, decanoyl peroxide, propionyl peroxide, acetyl peroxyesters, diperoxide derivatives, for example, t-butyl peroxypivalate, 2,4-dichlorobenzoyl peroxide, caprylyl peroxide, decanoyl peroxide, propionyl peroxide, acetyl peroxide, t-butyl peroxyisobutyrate, meta-chlorobenzoyl peroxide, benzoyl peroxide, hydroxyheptyl peroxide, chlorohexanone peroxides, 2,5-dimethylhexyl-2,5-di(peroxybenzoate), di-t-butyl diperphthalate, t-butyl peracetate, t-butylperbenzoate, dicumyl peroxide, 2,5-dimethyl-2,5-di(t-butylperoxy)hexane, t-butyl hydroperoxide, di-t-butyl peroxide, methyl ethyl ketone peroxide, p-methane hydroperoxide, cumene hydroperoxide, 2,5-dimethylhexyl-2,5-dihydroperoxide, t-butyl hydroperoxide, peracetic acid, perbenzoic acid, m-chloroperbenzoic acid, etc.

Cationically polymerizable organic materials which can be used to make the heat curable compositions of the present invention include epoxy resins, thermosetting organic condensation resins of formaldehyde, vinyl organic prepolymers, cyclic ethers, etc.

The term "epoxy resin" as utilized in the description of the cationically polymerizable compositions of the present invention, includes any monomeric, dimeric or oligomeric or polymeric epoxy material containing one or a plurality of epoxy functional groups. For example, those resins which result from the reaction of bisphenol-A (4,4'-isopropylidenediphenol) and epichlorohydrin, or by the reaction of low molecular weight phenol formaldehyde resin (Novolak resin) with epichlorohydrin, can be used alone or in combination with an epoxy containing compound as a reactive diluent. Such diluents as phenyl glycidyl ether, 4-vinylcyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxy siloxane resins, epoxy-polyurethanes and epoxy-polyesters. Such polymers usually have epoxy functional groups at the end of their chains. Epoxy-siloxane resins and method for making are more particularly shown by E. P. Plueddemann and G. Fanger, J. Am. Chem. Soc. 80 2632-5 (1959). As described in the literature, epoxy resins can also be modified in a number of standard ways such as reaction with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,840; 3,567,797; 3,677,995; etc. Further coreactants which can be used with epoxy resins are hydroxy terminated flexibilizers such as hydroxyterminated polyesters, shown in the Encyclopedia of Polymer Science and Technology, Vol. 6, 1967, Interscience Publishers, New York, pp. 209-271 and particularly p. 238.

Included by the thermosetting organic condensation resins of formaldehyde which can be used in the practice of the present invention are, for example, urea type resin, such as

[CH$_2$=N-CONH$_2$]$_x$·H$_2$O,

[CH$_2$=NCONH$_2$]HD xCH$_3$COOH,

[CH$_2$=NCONHCH$_2$NHCONHCH$_2$OH]$_2$;

phenol-formaldehyde type resin, such as

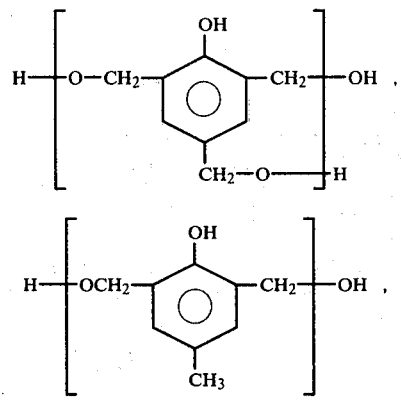

where x and n are integers having a value of 1 or greater;

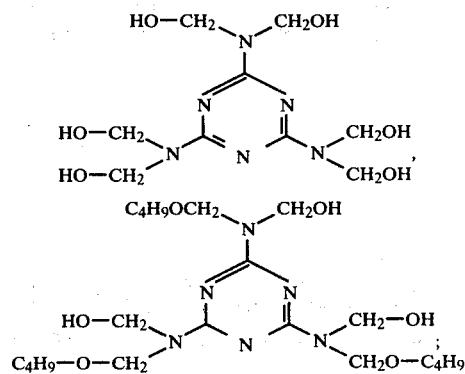

alkoxy silanes having the formula, ($R^7O$)$_m$ Si ($R^8$)$_n$, where $R^7$ is a $C_{(1-7)}$ alkyl radical, $R^8$ is selected from $R^7$ radicals and $C_{(6-13)}$ aryl radicals and halogenated derivatves, m is an integer equal to 1 to 4, n is an integer equal to 0 to 3 inclusive and m+n is equal to 4.

In addition, there can be used melamine thiourea resins, melamine, or urea aldehyde resins, cresol-formaldehyde resins and combinations with other carboxy, hydroxyl, amino and mercapto containing resins, such as polyesters, alkyds and polysulfides.

Some of the vinyl organic prepolymers which can be used to make the polymerizable compositions of the present invention are, for example, CH$_2$=CH—O—(CH$_2$—CH$_2$O)$_{n'}$—CH=CH$_2$, where n' is a positive integer having a value up to about 1000 or higher; multifunctional vinylethers, such as 1,2,3-propane trivinyl ether, trimethylolpropane trivinylether, prepolymers having the formula,

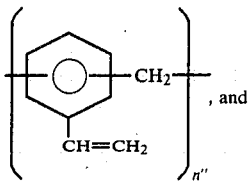

low molecular weight polybutadiene having a viscosity of from 200 to 10,000 centipoises at 25° C., etc. Products resulting from the cure of such compositions can be used as printing inks and other applications typical of thermosetting resins.

A further category of the organic materials which can be used to make the polymerizable compositions are cyclic ethers which are convertible to thermoplastics. Included by such cyclic ethers are, for example, oxetanes such as 3,3-bischloromethyloxetane, alkoxyoxetanes as shown by Schroeter U.S. Pat. No. 3,673,216, assigned to the same assignee as the present invention; oxolanes such as tetrahydrofuran, oxepanes, oxygen containing spiro compounds, trioxane, dioxolane, etc.

In addition to cyclic ethers, there are also included cyclic esters such as $\beta$-lactones, for example propiolactone, cyclic amines, such as 1,3,3-trimethyl-azetidine and organosilicone cyclics, for example, materials included by the formula,

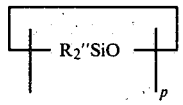

where $R''$ can be the same or different monovalent organic radical such as methyl or phenyl and p is an integer equal to 3 to 8 inclusive. An example of an organosilicone cyclic is hexamethyl trisiloxane, octamethyl tetrasiloxane, etc. The product made in accordance with the present invention are high molecular weight oils and gums.

In particular instances, depending upon the compatability of the dialkylhydroxyarylsulfonium salt with the organic material, the sulfonium salt can be dissolved or dispersed in an organic solvent such as nitromethane, acetonitrile, methylene chloride, etc., prior to its incorporation into the organic material. Experience has shown that the proportion of sulfonium salt to organic material can vary widely inasmuch as the salt is substantially inert, unless activated.

In the practice of the invention, the curable compositions can be made by effecting contact between the dialkyl hydroxyarylsulfonium salt, the cationically polymerizable organic resin and the organic oxidant as previously defined. There can be used 0.1 to 10% by weight of the dialkyl hydroxyarylsulfonium salt based on the weight of cationically polymerizable organic material. In certain situations, a volatile organic solvent also can be utilized in combination with the aforementioned ingredients to produce a foam, based on the vaporization of the organic solvent due to the generation of exothermic heat of reaction while the cationically polymerizable organic resin is curing.

It has been found that contact between the various ingredients of the curable mixture of the present invention can be effected if the dialkylhydroxyarylsulfonium salt is contacted with the organic oxidant in the presence of the cationically polymerizable organic material. For example, the sulfonium salt can be combined with an epoxy resin to produce a stable mixture while the organic oxidant can separately be employed in combination with an epoxy resin which also has infinite shelf stability. In instances where a foam is desired, a volatile organic solvent can be combined with either of the aforementioned stable mixtures or can be introduced separately during the mixing of the respective mixtures. Suitable volatile organic solvents which can be employed to produce rigid or flexible foams in the practice of the present invention are, for example, acetone, hexane, trichlorofluoromethane, n-pentane, 2-methylhexane, dichloromethane, 1,1,2-trichlorotrifluoroethane, methyl alcohol, ethyl alcohol, methyl ethyl ketone, etc. In addition to such volatile solvents, there are also included thermally unstable compounds such as ethylene carbonate, ammonium nitrite, benzoyl peroxide, cyclohexanone peroxide, methyl ethyl ketone peroxide, 2,2'-azobis(2-methylpropionitrile), azobisformamide, etc.

The foamable mixture can be injection molded into suitable receptacles, such as refrigerator doors and the like to provide for the production of insulating foams. Thorough mixing of the ingredients has been found to facilitate the production of a uniform foam which can be achieved by the employment of a mechanical stirrer or agitator, as generally utilized in the art.

In instances where a flexible foam is desired, the above described epoxy resin can be combined with polycaprolactones or any hydroxy terminated polyester or polyetherpolyol to render the foams made in accordance with the present invention more flexible. Typical hydroxy-terminated polycaprolactones are Niax polyols, manufactured by the Union Carbide Corporation. There can be utilized from 1 to 50 parts of the hydroxyterminated polyester per part of the epoxy resin and preferably from 1 to 10 parts. Included by the hydroxy-terminated polyester which can be employed in the practice of the present invention to flexibilize cured epoxy resin films or foams are compounds of the formula,

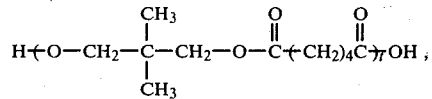

where t is an integer having an average value of from 1 to 100.

As previously indicated, the curable compositions of the present invention also can be used in coating applications and in the production of rigid or flexible films. In addition to the cationically polymerizable organic resin which includes any of the aforementioned epoxy resins, as well as the organic cyclics as previously defined, as well as additives, such as polycaprolactones for flexibilizing the films and foams made therefrom, there also can be combined with such ingredients fillers in a proportion by weight of from 0 to 500 parts of such filler per 100 parts of the cationically polymerizable organic resin. Suitable fillers include, for example, talc, alumina, sand, silica, ground quartz, wood flour, carbon black, glass fibers, mica, barium sulfate, titanium dioxide, etc.

In addition, the above curable compositions may include additives to enhance surface properties and to control foam cell size. Among such additives are polyalkylene oxide surfactants and silicone fluids.

In order that those skilled in the art will be better able to practice the present invention, the following exampls are given by way of illustration and not by way of limitation. All parts are by weight.

EXAMPLE 1

Various dialkyl hydroxyarylsulfonium salts were used in combination with iodosobenzene diacetate as curing agents for 3,4-epoxycyclohexylmethyl-3',4'-epoxycyclohexene carboxylate. The sulfonium salt was added to the respective mixtures at 3% by weight and the iodosobenzene diacetate was utilized at 6% by weight based on the total weight of the respective mixtures. The sulfonium salts used were dimethyl-4-hydroxy-3,5-dimethylphenylsulfonium hexafluoroarsenate of the formula,

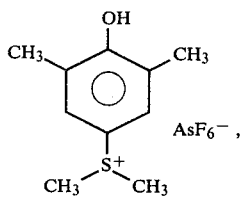

and dimethyl-4-hydroxy-3,5-dimethoxyphenylsulfonium hexafluoroarsenate of the formula,

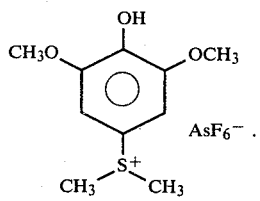

The respective mixtures were then stirred under ambient conditions and allowed to rest. Each of the mixtures gelled within three minutes to form a hard crosslinked mass.

EXAMPLE 2

A mixture of the epoxy resin of Example 1 and 3% by weight of dimethyl-4-hydroxy-3,5-dimethoxyphenylsulfonium hexafluoroarsenate was stirred with a peracetic acid solution in toluene containing about 0.5% by weight of cobalt napthanate. The mixture was then vigorously stirred and allowed to stand under atmospheric conditions. There was obtained a hard crosslinked mass within 5 minutes.

EXAMPLE 3

Acetone was added to a mixture while it was stirred consisting of 3% by weight of dimethyl-4-hydroxy-3,5-dimethoxy phenylsulfonium hexafluoroarsenate, 6% by weight of iodosobenzene diacetate and about 91% by weight of 3,5-epoxycyclohexylmethyl-3',4'-epoxycyclohexane carboxylate. The resulting mixturen containing 10% by weight of acetone was allowed to rest under atmospheric conditions. After 10 minutes there was obtained a low density rigid foam useful as a thermal insulator.

EXAMPLE 4

A mixture composed of 10 parts of 3,4-epoxycyclohexylmethyl-3',4'-epoxycyclohexane carboxylate, 0.15 part 2,3-dichloro-5,6-dicyano-1,4-benzoquinone and 0.15 part of dimethyl-4-hydroxy-3,5-dimethoxyphenyl-sulfonium hexafluoro-arsenate was rapidly stirred until the mixture became uniform. The mixture was then allowed to stand. The mixture thereafter turned an intense red color and it gelled after 5 minutes while generating exothermic heat of reaction.

EXAMPLE 5

There was added 1.5 part of iodosobenzene diacetate and 1.5 part of dimethyl-4-hydroxy-3,5-dimethoxyphenylsulfonium hexafluoroarsenate to 10 parts diethyleneglycol divinyl ether. The mixture polymerized rapidly and cured to a hard polymeric mass within 8 minutes. The curable composition is useful as a potting resin.

EXAMPLE 6

The above example was repeated except triethyleneglycol divinyl ether was used as the cationically polymerizable organic material.

EXAMPLE 7

There was added 0.15 part of dimethyl-3,5-dimethyl-4-hydroxyphenylsulfonium hexafluoroarsenate and 0.15 part of 3-chloroiodosobenzene diacetate, to 5 parts of 4-vinylcyclohexene dioxide. The mixture was stirred until the ingredients were dissolved and then allowed to stand in the dark. A hard crosslinked product was obtained after 2 hours.

EXAMPLE 8

There were added 0.1 part of methyl ethyl ketone peroxide, as a 60% solution in dimethylphthalate (Lucidol Lupersal ® DDM) and 0.01 part of cobalt napthenate (Mooney Chemicals 12% Cobalt Chem-all) to a mixture of 5 parts of 4-vinylcyclohexene dioxide and 0.15 part of the sulfonium salt

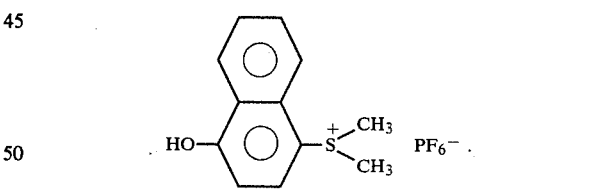

On standing for 8 hours, the resulting fluid mixture hardened.

EXAMPLE 9

A mixture of 10 parts of 3,4-epoxycyclohexylmethyl-3',4'-epoxycyclohexane carbonylate, 0.15 part of dimethyl-3,5-dimethoxy-4-hydroxyphenylsulfonium hexafluoroarsenate and 0.15 part of o-chloranil was allowed to rest under ambient conditions in the dark. After standing for 7 hours, the mixture converted to a hard solid. Those skilled in the art would know that the mixture would be useful as an encapsulating compound.

EXAMPLE 10

There were added 0.30 part of dimethyl-3,5-dimethoxy-4-hydroxyphenylsulfonium hexafluoroarsenate, 0.15 part of t-butylhydroperoxide and 0.005 part of copper napthenate (6.0% solution in mineral spirits) to 10 parts of 4-viylcyclohexene dioxide. The mixture hardened spontaneously after standing for 8 hours in the dark at room temperature.

The above procedure was repeated, except that dimethyl-3,5-dimethyl-4-hydroxyphenylsulfonium hexafluoroarsenate was substituted for the above mentioned sulfonium catalyst. The same results were obtained. In addition, similar results were obtained when t-butylhydroperoxide was substituted with methylethyl ketone peroxide.

EXAMPLE 11

There were added 0.3 part dimethyl-3,5-dimethoxy-4-hydroxy phenylsulfonium hexafluoroarsenate, 0.1 part of diphenylamine and 0.3 part of 40% peracetic acid to 10 parts of ERL 4221 (3,4-epoxycyclohexylmethyl-3',4'-epoxycyclohexane carboxylate). An immediate exothermic reaction resulted followed by gellation of the epoxy resin.

EXAMPLE 12

The above procedure was repeated, except that the Epon 828, a diglycidyl ether of 4,4'-isopropylidene diphenol was used as the epoxy resin. It was found that the mixture gelled in 5 hours. Those skilled in the art would know that the formulation was useful as an adhesive or encapsulating resin.

EXAMPLE 13

There were added 0.3 part of dimethyl-3-methyl-4-hydroxyphenylsulfonium hexafluoroarsenate, 0.02 part of diphenylamine and 0.3 part of 40% peracetic acid to 10 parts of Methylon resin (a phenol-novolak resole made by the General Electric Company). The mixture hardened to the insoluble cured state on standing for 15 hours.

EXAMPLE 14

A mixture consisting of 100 parts Epon 828, 0.2 part of diphenylamine and 6 parts of 40% peracetic acid was combined with 3 parts of

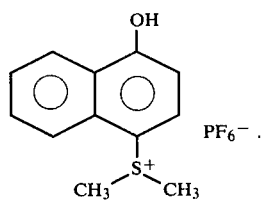

The mixture was stirred and then poured into a 6 in. × ¾ in. × ¼ in. silicone rubber mold. On standing for 8 hours, a hard crosslinked molded part was obtained.

Although the above examples are directed to only a few of the compositions of the present invention, it should be understood that the present invention is directed to a much broader class of curable compositions and method for making foams as shown by the description preceding these examples.

What I claim as new and desire to secure by Letters Patent of the United States is:

1. Heat curable compositions comprising
   (A) cationically polymerizable organic material, and
   (B) an effective amount of a curing agent consisting essentially of 0.1 to 10% by weight of (A) of a dialkylhydroxyarylsulfonium salt of the formula, $[R(R^1)_aS]^+[Y]^-$,
   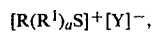

and 0.1 to 10% by weight of the heat curable composition of an organic oxidant selected from iodosoaromatic organic compounds, and organic peroxides having 0.1 to 50% by weight of organic peroxide of a decomposition accelerator selected from organic amines and transition metals, where R is a $C_{(6-20)}$ aromatic radical having from 1 to 3 nuclearly bonded hydroxy radicals, $R^1$ can be the same or different $C_{(1-8)}$ alkyl radical or an alkylene radical capable of forming a cycloaliphatic or heterocyclic ring, Y is a nonnucleophilic anion, a is an integer equal to 0 or 2, and when $R^1$ is alkyl, a is 2, and when $R^1$ is alkylene, a is 1.

2. A curable composition in accordance with claim 1, where the dialkylhydroxyarylsulfonium salt has the formula,

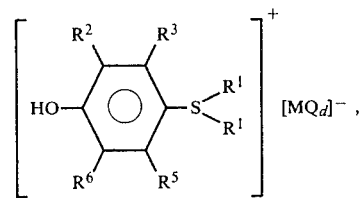

where $R^1$ is a $C_{(1-8)}$ alkyl radical, M is a metal or metalloid, Q is a halogen radical, $R^2$–$R^6$ are monovalent radicals selected from hydrogen, $C_{(1-8)}$ alkyl, $C_{(1-8)}$ alkoxy, nitro, and chloro, and d is an integer equal to 4–6 inclusive.

3. A curable composition in accordance with claim 1, where the sulfonium salt is dimethyl-4-hydroxyl-3,5-dimethylphenylsulfonium hexafluoroarsenate.

4. A curable composition in accordance with claim 1, where the cationically polymerizable organic material is an epoxy resin.

5. A curable composition in accordance with claim 1, where the organic oxidant is iodosobenzene diacetate.

6. A curable composition in accordance with claim 1, where the cationically polymerizable material is a vinyl ether.

7. A curable composition in accordance with claim 1, where the cationically polymerizable material is a phenol-novolak resole.

8. A curable composition in accordance with claim 1, where the organic oxidant is an organic amine accelerated organic peroxide.

9. A curable composition in accordance with claim 1, where the organic oxidant is a transition metal compound accelerated organic peroxide.

10. Heat curable compositions comprising
    (C) cationically polymerizable organic material, and
    (D) 0.1 to 10% by weight of the cationically polymerizable organic material of a dialkylhydroxyarylsulfonium salt of the formula, $[R(R^1)_aS]^+[Y]^-$,
    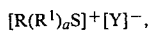

and 0.1 to 10% by weight of the heat curable composition of 2,3-dichloro-5,6-dicyano-1,4-benzoquinone, where R is a $C_{(6-20)}$ aromatic radical having from 1 to 3 nuclearly bonded hydroxy radicals, $R^1$ can be the same or different $C_{(1-8)}$ alkyl radical or an alkylene radical capable of forming a cycloaliphatic or heterocyclic ring, Y is a non-nucleophilic anion, a is an integer equal to 1 or 2; and when $R^1$ is alkyl, a is 2, and when $R^1$ is alkylene, a is 1.

* * * * *